United States Patent [19]

Belmares-Sarabia et al.

[11] Patent Number: 4,907,071
[45] Date of Patent: Mar. 6, 1990

[54] COLOR MATCHING SYSTEM AND METHOD

[75] Inventors: Armand Belmares-Sarabia, Oak Beach, N.Y.; Stanley J. Chayka, Parsippany, N.J.

[73] Assignee: Corporate Communications Consultants, Inc., Fairfield, N.J.

[21] Appl. No.: 253,448

[22] Filed: Oct. 4, 1988

Related U.S. Application Data

[62] Division of Ser. No. 68,122, Jun. 30, 1987, abandoned, which is a division of Ser. No. 598,468, Apr. 9, 1984, Pat. No. 4,679,067.

[51] Int. Cl.⁴ ............... H04N 9/73; H04N 9/74
[52] U.S. Cl. ............................. 358/22; 358/80
[58] Field of Search ..................... 358/22, 80

[56] References Cited

U.S. PATENT DOCUMENTS

| | | | |
|---|---|---|---|
| 3,603,729 | 9/1971 | Sperber | 358/105 |
| 3,772,465 | 11/1973 | Vlahos et al. | 358/22 |
| 3,780,223 | 12/1973 | Perry | 358/183 |
| 3,781,468 | 12/1973 | Chomet et al. | 358/105 |
| 4,199,790 | 4/1980 | Greenfield et al. | 358/183 |
| 4,258,385 | 3/1981 | Greenberg et al. | 358/22 |
| 4,274,107 | 6/1981 | Tamura et al. | 358/29 |
| 4,318,081 | 3/1982 | Yoshida | 382/48 |
| 4,349,279 | 9/1982 | Jung | 358/80 |
| 4,396,939 | 8/1983 | Kitahama | 358/22 |
| 4,475,124 | 10/1984 | Ankeny et al. | 358/183 |
| 4,488,245 | 12/1984 | Dalke et al. | 358/80 |
| 4,525,736 | 6/1985 | Korman | 358/28 |
| 4,533,938 | 8/1985 | Hurst | 358/27 |

FOREIGN PATENT DOCUMENTS 50795  4/1980  Japan ..................... 358/29

OTHER PUBLICATIONS

Pearson et al, "A Simple Motion Detector for Television Signals", Journal of the SMPTE, vol. 82, pp. 17-22, Jan. 1973.
Lancaster, CMOS Cookbook, p. 257, 1977.

Primary Examiner—John W. Shepperd
Attorney, Agent, or Firm—Curtis, Morris & Safford

[57] ABSTRACT

In a video color correction and matching technique, a first picture composed of color video signals is displayed on a monitor screen and video signals from a limited area on the screen which contain a color, desired to be corrected or matched, are sampled and stored in a signal storage area. A second color video picture, subsequently displayed on the monitor screen, contains a limited area having the same color to be corrected or matched as in the limited area of the first picture. Signals from the limited area of the second picture are sampled and compared to the stored signals of the limited area of the first picture and adjusted to agree with the color video signals from the limited area in the first picture.

11 Claims, 2 Drawing Sheets

COLOR MATCHING SYSTEM AND METHOD

This application is a division of application Ser. No. 068,122, filed June 30, 1987, now abandoned which is a division of Ser. No. 598,468 filed Apr. 9, 1984, now U.S. Pat. No. 4,679,067.

This invention relates to the color matching of video signals, and particularly to automatically matching the color signal to that of a pre-existing standard. This patent is a division of U.S. Pat. No. 4,679,067 whose disclosure is hereby incorporated by reference.

There is a continuing need to improve the efficiency, speed and accuracy of color matching of video signals, particularly in scene-by-scene color correction. It is an object of the invention to provide such improvement.

In accordance with an aspect of the present invention, a technique for color correction of video color signals is described wherein a first picture composed of color video signals is displayed on a monitor screen. Signals from a limited area on the screen which contain a specific color desiring to be corrected are sampled and stored in a signal storage area. A second picture is subsequently displayed on the monitor screen, which contains a limited area having the same color as in the limited area of the first picture. Signals from the limited area of the second picture are sampled and compared to the signals of the limited area of the first picture, which were recalled from the signal storage area. After completing the comparison, the signals from the limited area of the second picture are adjusted to agree with the color signals from the limited area in the first picture, thereby forming a color correction signal.

In another aspect of the invention, the color correction signal, obtained from comparing the sampled color video signals of a first picture to those of a second picture and then adjusting the color video signal of the second picture so as to agree with that of the first picture, is combined with the color video signals from the second picture thereby forming a color video signal which matches the color video signal of the first picture.

In yet another aspect of the present invention, the comparison between the sampled color video signals from a limited area in a first picture to that in a second picture consists of comparing the luminance signals and the hue and saturation values for the group comprises either red, green, blue, magenta, cyan or yellow, or I and Q. The comparison results are then used to develop correction values for the color video signals of the second limited area.

Preferably in this arrangement the sampling of the color signals is performed by either a window generator, a light pen, a touch-screen or such similar means. These means allow for easy selection of a limited area on the monitor screen which contain only the desired colored object whose color is sought to be matched. The use of these sampling means and automatic color matching greatly increases the speed at which video color corrections can be accomplished. For instance, if the balance achieved for one picture is suitable for use in others, it can be stored and reutilized, thereby further speeding the color correction process.

The foregoing and other objects and advantages of the present invention will be described and are apparent from the following description and drawings.

COLOR MATCHING

Figure 1:
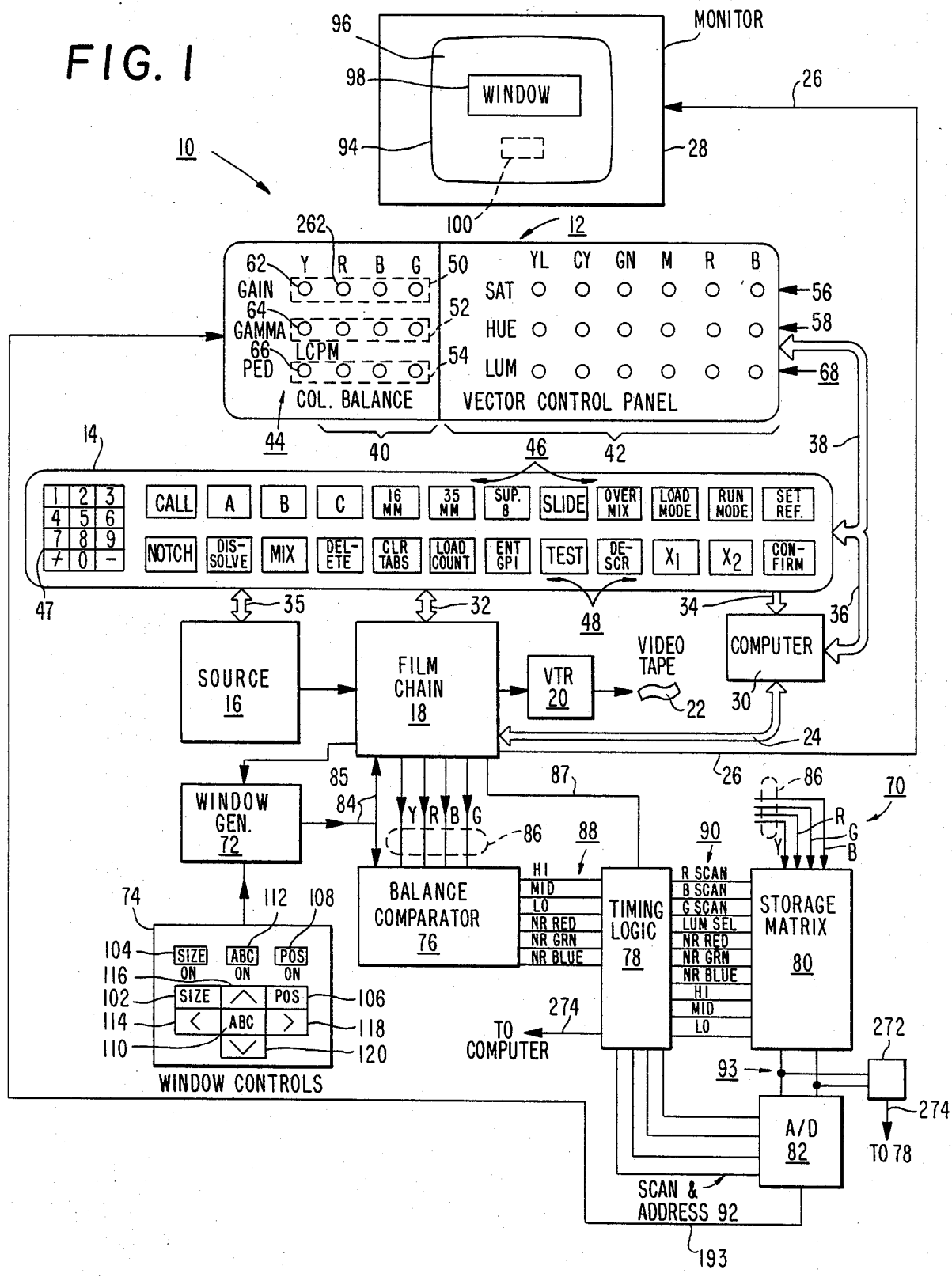
FIG. 1 is a schematic circuit diagram of a color correction system constructed in accordance with the present invention.

The invention can be used to great advantage in automatic color matching; that is, in automatically matching the color of a colored area to that of a pre-existing standard, so as to improve both the speed and quality of color correction. The full details of the system shown in FIG. 1 and the component shown in FIG. 2 have not been set forth in this description since they are described sufficiently in the patent mentioned above. Reference should be made to this patent for further details.

In this embodiment, it is preferred to use either a light-pen or a touch-screen to define a small sample area on the monitor screen. The operator places the light pen on the monitor screen at a location where the picture is supposed to be black. The machine automatically corrects the pedestal for R, G and B to the level sufficient to produce a neutral black. Then, the machine sequences automatically, or the operator presses a "gray" button (not shown) and locates the light pen in an area of the picture which is supposed to be gray, and the machine automatically compensates or corrects the gamma of R, B and G to give a neutral gray. Next, the machine sequences automatically, or the operator presses the white button and locates the light pen at a white portion of the screen, and the machine automatically adjusts the gain of R, B and G to give a neutral white. Then, the gain, gamma and pedestal correction signal values are stored for that frame or scene.

When a new scene is defined as in the Rainbow patent, the corrections are executed as described in that patent.

If there is a particular area of the scene for which a specific color is required to be stored, such as for the color of a product, or flesh tones of a person's face, or a blue sky, etc., a first "memory-select" button (not shown) is pressed. Then, the light pen is directed to that portion of the picture, and the full video levels, at that picture location, for yellow, green, cyan, blue, magenta and red signals are stored, and/or the values of I and Q signals are stored. The luminance value also is stored.

Figures 2, 3:
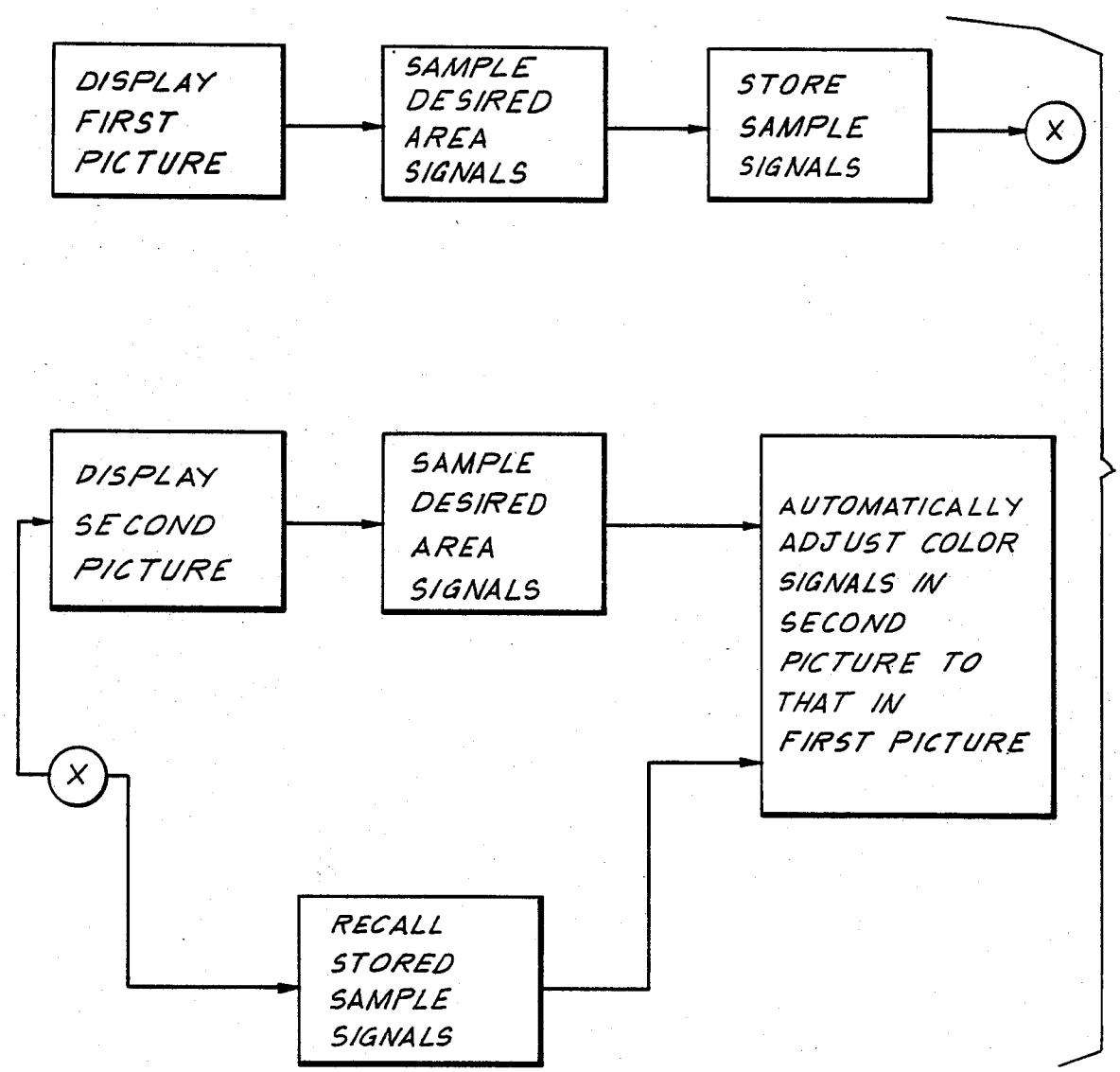
FIG. 2 is a perspective view of an alternative component utilized in accordance with the present invention.
FIG. 3 is a flow chart, in block diagram format, illustrating an embodiment of the present invention.

The same procedure can be repeated for each subsequent scene, or frame, or for a different specifically colored object in the same frame. When a particular object appears in a new scene which has appeared in a previous scene, a light pen is directed to that object and the trigger 271 (FIG. 2) on it is operated. The resulting signal from the light pen is used to form a small window which thereafter behaves in the manner described above for the window 98. Then, the luminance of the new object is compared with the luminance of the same object in the previous scene. If there is any difference between the two, the values of either I and Q, or red, green, blue, magenta, cyan and yellow are multiplied by the factor necessary to multiply the luminance to make the two luminances equal. Then, the resulting hue and saturation signals for red, green, blue, magenta, cyan and yellow, or I and Q, are compared with the prior values, and correction signals for each of the values are developed in the manner described in the reference patent for the automatic balance circuit. Then, the correction values are stored for that frame and used in the manner described above. In FIG. 3, an embodiment of this system is described using a flow chart.

Some of the advantages of this system and method are:

It allows unskilled operators to do accurate color corrections quickly.

The color corrections are much faster than in the past, even for experienced operators.

It allows the more skilled operators to be more accurate because they do not have to remember, from one scene to the next, what the color of a given item is supposed to look like. That is, for example, once the Eastman Kodak yellow is correct, the operator can repeat the color quickly for each subsequent scene in which it appears, without having to stop and make an independent judgment as to the correctness of the color in that scene.

I claim:

1. A method of color correction of video signals comprising displaying a picture composed of said signals on a video monitor screen, sampling the video signals forming a limited zone of said picture, said zone limiting the signals sampled to those of a specific colored area, storing color component signals for said colored area when it appears in one frame, displaying another colored area in another frame, said other colored area to have the same color as said first colored area, sampling said other colored area, recalling the stored component signals, automatically adjusting the component signals of said other area to those of the first area and storing the signals for adjusting the latter component signals.

2. A method as in claim 1 including limiting the sample taken of said second colored area to only the area containing the color to be adjusted.

3. A method as in claim 1 in which said sampling is done by a window generator or a light-pen, or a touch-screen.

4. A method as in claim 1 in which the values of the luminance signals of the first and second colored areas are equalized, and the I and Q or the hue and saturation of the color derivative signals are compared and equalized, the signal values necessary to create equalizations being stored.

5. Apparatus for color matching in video signal color correction for a television picture sequence, said apparatus comprising, in combination, sampling means for sampling the video signals in a first relatively small area of a first television picture in said sequence, means for correcting the sampled signals, memory means for storing the corrected signals, means for utilizing said corrected signals as reference signals for a second picture in said sequence, said sampling means being adapted to sample the video signals in a second relatively small area of said second picture, said second area and said first area each forming at least a part of the same image portion which appears in both pictures, and comparing means for comparing the video signals in said second area with those in said first area and developing correction signals to match the video signals in said second area to those in said first area.

6. Apparatus as in claim 5 in which said sampling means is adapted to selectively locate said first and second areas at substantially any place in the picture.

7. Apparatus as in claim 6 in which said sampling means is selected from the group consisting of a light pen, a touch-screen and a window generator.

8. Apparatus as in claim 5 in which said comparing means comprises means for comparing the luminance signals, and the hue and saturation values for parameters selected from the group consisting of either red, green, blue, magenta, cyan or yellow, or I and Q, from said first and second areas, and developing correction values for each of said signals in said second area.

9. Apparatus as in claim 5 including means for storing in memory signals corresponding to the correction signals and for reading them out of memory and for applying these to the video signals representing said image portion, and for transmitting the resulting signals to recording means.

10. A method of matching the colors of an object in a second picture in a video picture sequence to the colors of the same object in a first picture in said sequence, said method comprising the steps of sampling the video signals of a first relatively small area of said first picture said area forming at least a portion of said object so as to sample the color of only said object in said first picture, storing said video signals, sampling the video signals of a second relatively small area of said second picture, said area forming at least a portion of said object so as to sample the color of only said object in said second picture comparing the stored video signals with corresponding video signals from said second picture, and utilizing electrical adjusting means responsive to the differences between the video signals in said first and second pictures to develop electrical correction signals which, when combined with the video signals from said second picture, cause the video signals from the second picture to match those from the first picture.

11. A method as in claim 10 including the step of storing signals corresponding to the correction signals, and replaying said video picture sequence with said corrected signals being applied to said object when said second picture appears, and transmitting said signals to be recorded.

* * * * *